Figure 1:
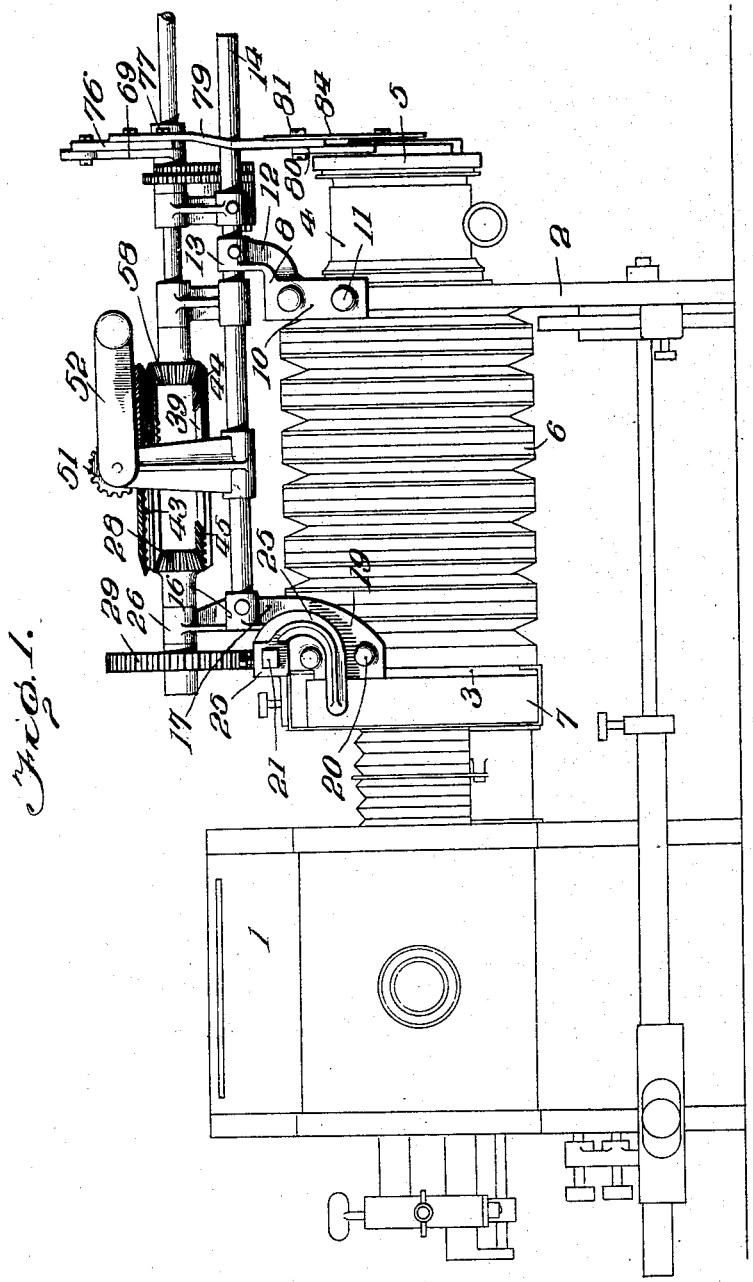

C. H. PARTINGTON.
DISSOLVING APPARATUS FOR STEREOPTICONS.
APPLICATION FILED MAR. 31, 1915.

1,172,628.

Patented Feb. 22, 1916.
4 SHEETS—SHEET 1.

Inventor
C. H. Partington.

Witnesses

By

Attorneys

C. H. PARTINGTON.
DISSOLVING APPARATUS FOR STEREOPTICONS.
APPLICATION FILED MAR. 31, 1915.

1,172,628.

Patented Feb. 22, 1916.
4 SHEETS—SHEET 2.

Witnesses

Inventor
C. H. Partington.
By
Attorneys

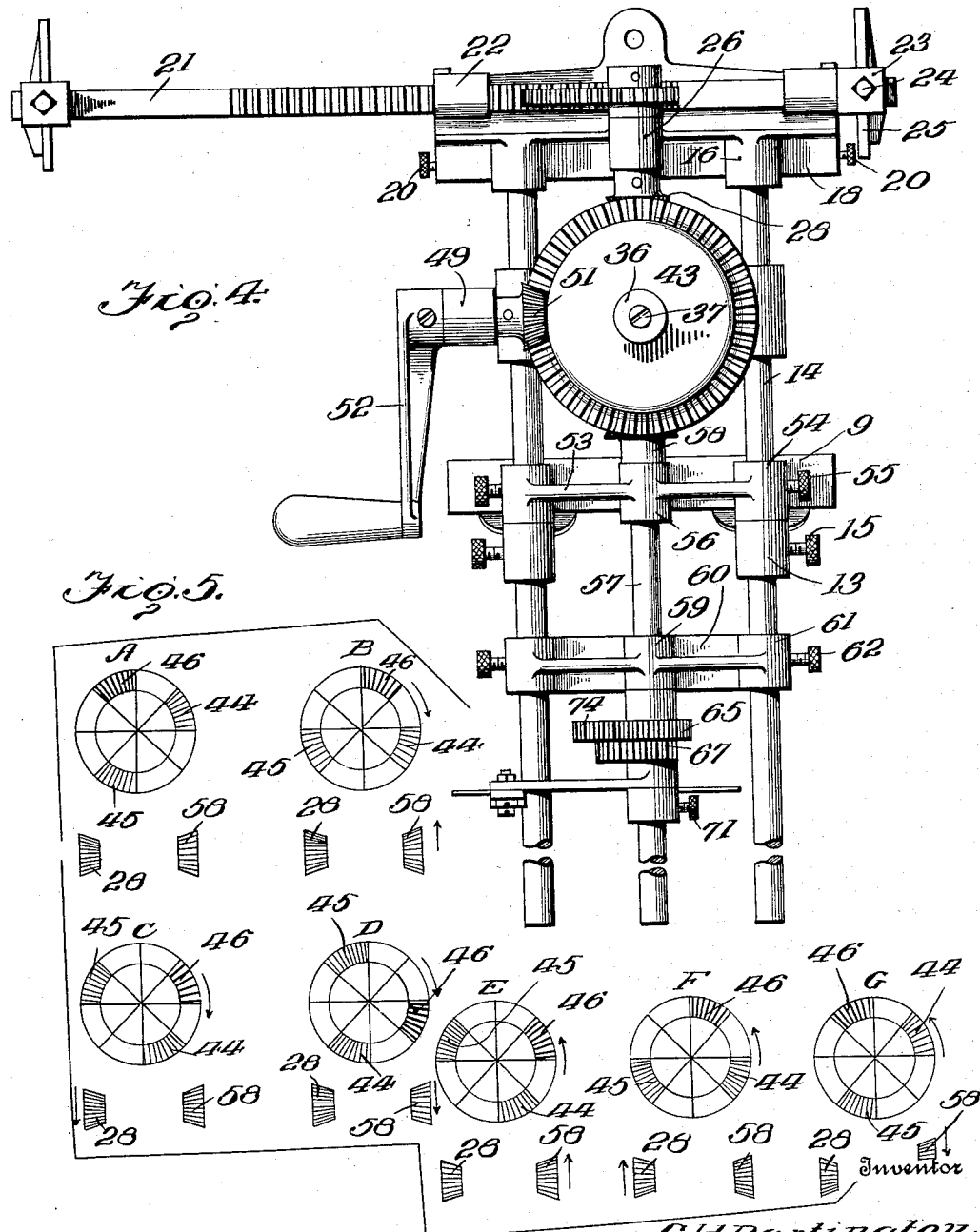

C. H. PARTINGTON.
DISSOLVING APPARATUS FOR STEREOPTICONS.
APPLICATION FILED MAR. 31, 1915.
1,172,628.
Patented Feb. 22, 1916.
4 SHEETS—SHEET 4.
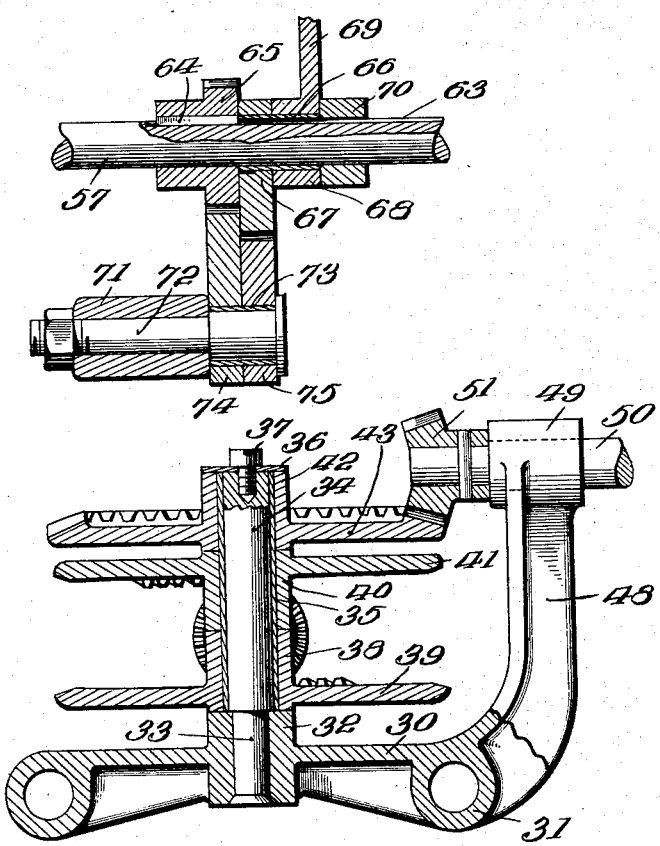
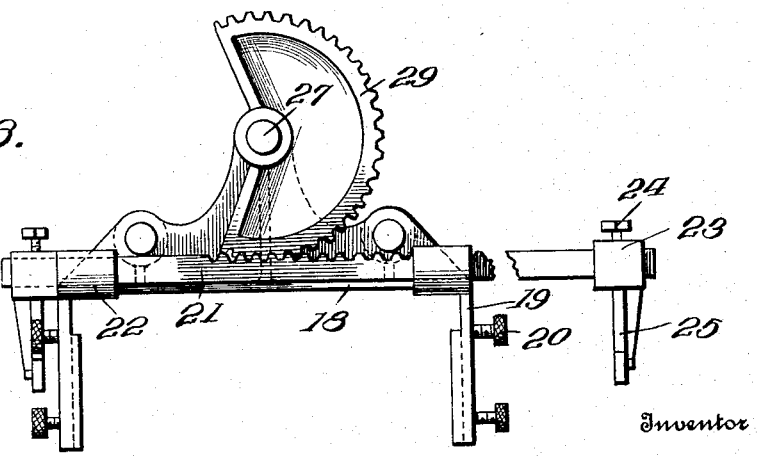
Witnesses
Inventor
C. H. Partington.
By
Attorneys

UNITED STATES PATENT OFFICE.

CHARLES H. PARTINGTON, OF CINCINNATI, OHIO.

DISSOLVING APPARATUS FOR STEREOPTICONS.

1,172,628.     Specification of Letters Patent.     Patented Feb. 22, 1916.

Application filed March 31, 1915. Serial No. 18,344.

*To all whom it may concern:*

Be it known that I, CHARLES H. PARTINGTON, a citizen of the United States, residing at Cincinnati, in the county of Hamilton and State of Ohio, have invented certain new and useful Improvements in Dissolving Apparatus for Stereopticons, of which the following is a specification.

This invention relates to view dissolving and slide shifting apparatus for stereopticons, and has as its object to provide an apparatus of the class mentioned adapted to permit of more convenient exhibition of the stereopticon views and in a manner to produce the most pleasing effects and without imposing any strain upon the eyes of the spectators.

In the exhibition of stereopticon views and where the views are dissolved one into another, it is customary to employ two slide carriers, two sets of lenses, and ordinarily two lamp houses. One method pursued is to gradually dim the light within one of the lamp houses so as to cause the picture, projected from the slide in the slide carrier associated with that particular lamp house and associated lenses, to fade from the screen and to simultaneously increase the intensity of the light in the other lamp house so as to cause the projection with gradually increasing intensity of a picture upon the screen from the other one of the slides. This method is not adaptable for use in connection with all of the various illuminating systems employed, and furthermore, considerable care and attention on the part of the operator is required in order that the slides may be removed and inserted at the proper moment. In another well known type of apparatus, employing two sets of lenses and two slide carriers, the lens mounts are equipped with iris diaphragms and the levers of the diaphragms are connected by a rod which may be shifted so as to cause one of the diaphragms to gradually close as the other gradually opens. While this particular type of apparatus may be employed with practically any system of illumination, nevertheless, the same care and attention is required on the part of the operator in manipulating the slides.

In view of the defects which are presented by the methods of projection above pointed out, the present invention aims to provide a view dissolving and slide shifting apparatus for stereopticons so constructed that the operation of a single crank, by the operator, will result in the complete but gradual automatic occultation of a slide being exhibited; the shifting of a tube slide carrier immediately subsequent to the occurrence of the period of complete occultation so as to position another slide for projection, the gradual and complete illumination of the last mentioned slide; and, the gradual and complete occultation of the last mentioned slide or view.

The invention contemplates further that the results above mentioned may be secured with the use of but a single set of lenses, a single slide carrier and a single source of illumination.

Figure 2:
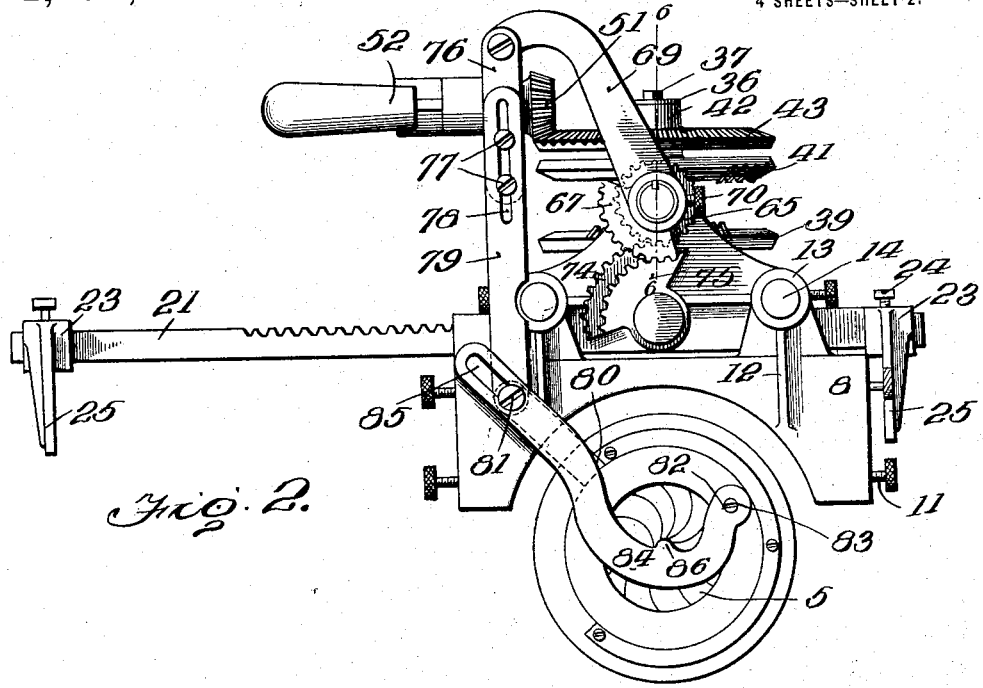
Figure 3:
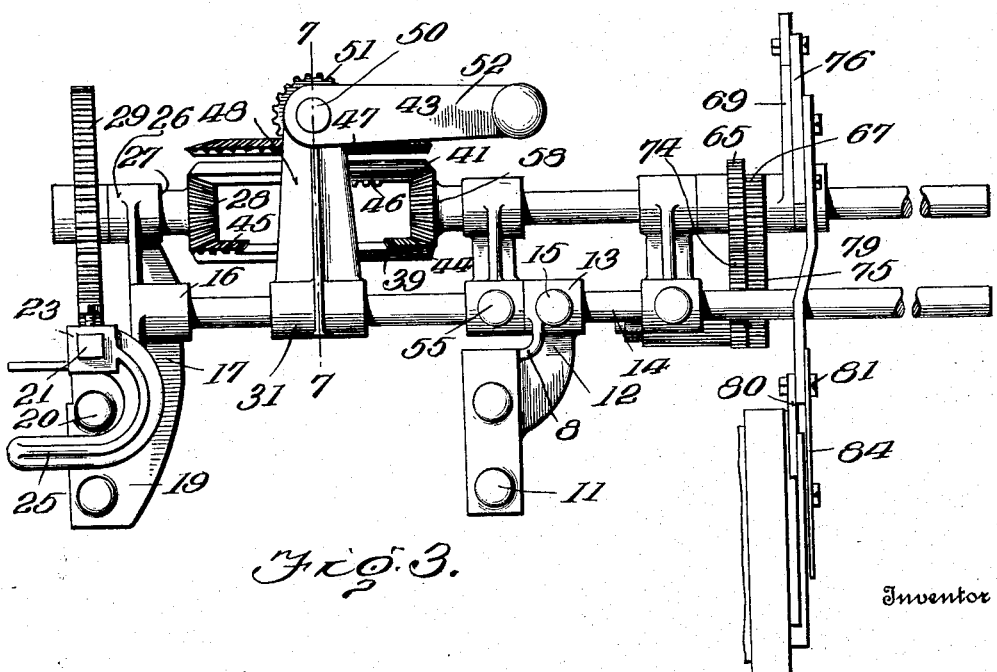

In the accompanying drawings: Figure 1 is a side elevation of the apparatus embodying the present invention applied to a well known type of stereopticon. Fig. 2 is a front elevation of the apparatus removed. Fig. 3 is a side elevation of the apparatus in detail. Fig. 4 is a plan view of the apparatus. Fig. 5 is a group diagrammatic view. Fig. 6 is a vertical longitudinal sectional view on the line 6—6 of Fig. 2. Fig. 7 is a vertical transverse sectional view on the line 7—7 of Fig. 3. Fig. 8 is a rear elevation of a portion of the apparatus.

Corresponding and like parts are referred to in the following description and indicated in all the views of the accompanying drawings by the same reference characters.

In the drawings there is illustrated in a general way a stereopticon, of which the lamp house is indicated by the numeral 1, the lens board by the numeral 2, and the lantern slide carrier frame or support by the numeral 3. The lens board 2 is equipped with the usual lens mount 4 and this mount is provided with an iris diaphragm 5. The lens board 2 and the slide carrier frame 3 are connected by the usual bellows 6 and slidably and removably mounted in the frame 3 is a double slide carrier 7. As all of these parts are of the ordinary construction, they are not illustrated in detail nor is it deemed necessary to specifically describe the same.

The apparatus embodying the present invention is supported upon the lens board 2 and slide carrier frame 3 and the supporting structure includes a forward bracket 8 having a top flange 9 and side flanges 10, this bracket being disposed upon the top of the lens board 2 and being secured thereto by means of set screws 11 which are threaded through the side flanges 10 and which bear against the lateral edges of the said lens board. This bracket includes forwardly and upwardly extending arms 12 provided at their upper ends with sleeve portions 13 in which are fitted supporting rods 14 clamped at adjustment by means of set screws 15 threaded through the said sleeve portions and bearing against said rods. These rods extend in parallel relation to each other both forwardly and rearwardly of the bracket arms 12 and their rear ends fit in sleeve portions 16 formed at the upper ends of arms 17 which comprise parts of a bracket including a transverse top portion 18 and depending flanges 19 which top portion and flanges engage respectively with the upper and side portions of the slide carrier frame 3 in the manner clearly shown in Fig. 1 of the drawings. Set screws 20 are threaded through the flanges 19 and bind against the sides of the frame and serve to hold the bracket in place thereon. As before stated, the lens board 2 and slide carrier supporting frame 3 are connected by a bellows 6 and it will be understood that in focusing the stereopticon the set screws 15 are loosened and the lens board is adjusted with relation to the slide carrier frame, after which the set screws are tightened so as to bind the rods 14.

The means provided for shifting the slide carrier 7 includes a rack bar 21 which is slidably mounted in sleeve portions 22 formed integral with the top portion 18 of the bracket. This rack bar 21 is preferably square in cross section and adjustably fitted upon each end thereof is a collar 23 held at adjustment by means of a set screw 24 and provided with a downwardly and rearwardly curved finger 25. When the frame 18 has been secured to the supporting frame 3 for the slide carrier the collars 23 are adjusted upon the rack bar 21 so as to bring the ends of the fingers 25 into clamping engagement with the ends of the slide carrier 7, after which the set screws 24 are tightened. The bracket 18 is further provided with a bearing 26 in which is rotatably mounted a shaft 27 carrying a beveled pinion 28 and a segmental gear 29, which gear coöperates with the rack bar in the manner clearly shown in Fig. 8 of the drawings. Rotary motion is imparted to the shaft 27 in a manner which will be presently explained.

The numeral 30 indicates a supporting frame having sleeve portions 31 which fit the rods 14, the frame extending between the said rods and being provided at an intermediate point with a vertically disposed sleeve portion 32 in which is secured the lower reduced end 33 of a fixed shaft 34. A sleeve 35 is rotatably fitted upon the shaft 34 and held against upward displacement by a cap washer 36 and securing screw 37, the washer being disposed against the upper end of the shaft and being held in place by means of the said screw. The hub portion 38 of a gear 39 is fixed upon the lower end of the sleeve 35 by a sweating or other suitable process and also fixed upon the sleeve immediately above the hub 38 is the hub 40 upon a gear 41. In a like manner the hub 42 of a gear 43 is secured upon the upper end of the sleeve above the hub 40. At this point it will be apparent that all of the gears 39, 41 and 43 rotate in unison with the sleeve 35, and all of these gears are of the beveled type and the gears 39 and 41 have their bevels presented toward each other. The gear 39 is provided with a series of teeth 44 which extend throughout an arc of substantially 45 degrees and with a series of teeth 45 which also extend throughout an arc of substantially 45 degrees, and the adjacent ends of the two series of teeth 44 and 45 are spaced apart an angular distance of 90 degrees. The gear 41 is provided with a single series of teeth 46 which extend throughout an arc of 45 degrees and this series is spaced from the series of teeth 44 of the gear 39 an angular distance of 45 degrees and from the series of teeth 45 of the said gear 39 an angular distance of 90 degrees. The gear 43 is provided with a continuous uninterrupted series of teeth 47.

By reference to Fig. 3 it will be observed that the pinion 28 lies between the gears 39 and 41 and is arranged to coöperate with the series of teeth 45. The bearing frame 30 is provided at one side with an upstanding laterally disposed arm 48 having a bearing 49 at its upper end in which is rotatably mounted a shaft 50 having fixed upon it a beveled pinion 51 meshing with the teeth of the gear 43. A crank handle 52 is fixed upon the shaft 50 and may be turned for the purpose of imparting rotary motion to the gear 43 and through the sleeve 35 to the gears 39 and 41. A bearing frame 53 is provided at its opposite sides with sleeve portions 54 which fit the rods 14 and are secured thereto by means of set screws 55, and this bearing frame is provided between its sleeve portions 54 with a bearing 56 in which is rotatably mounted a shaft 57, having fixed upon it a beveled pinion 58 which lies between the gears 39 and 41 and is designed to mesh with and be rotated by coöperation with the gear teeth 44 and 46 upon the said gears 39 and 41 respectively.

The shaft 57 constitutes an element of the means provided for opening and closing the diaphragm 5, and this means will now be more fully described. The shaft 57 is supported also in a bearing portion 59 upon a bearing frame 60 which is provided with sleeve portions 61 engaging the rods 14 and secured thereto by means of set screws 62. The shaft 57 is provided with a key-way 63 in which is slidably received a key 64 carried by the hub of a pinion 65. The numeral 66 indicates a sleeve which is rotatably mounted upon the shaft 57 in advance of the pinion 65 and fixed in any suitable manner upon this sleeve 66 at the rear end thereof is the hub portion of a segmental gear 67. In a like manner, a collar 68 is fixed upon the sleeve and this collar is provided with an arm 69 which extends upwardly and laterally therefrom and which serves a purpose to be presently explained. A collar 70 is fixed upon the shaft 57 by means of a set screw 71 and serves to retain the sleeve 66 against longitudinal movement upon the shaft and yet permit of the same rotating freely. The bracket 60 includes, in addition to the bearing portion 59, a bearing portion 71 located below the portion 59 and having fixed therein the reduced portion of a stationary shaft 72. Rotatably mounted upon the forward end of this shaft is a sleeve 73 having secured upon it a segmental gear 74 and a segmental gear 75. The gear 74 meshes with the pinion 65 and is driven therefrom, and the gear 75 meshes with the gear 67 and imparts motion thereto and through the medium of the sleeve 66 to the arm 69, when the shaft 57 is rotated under conditions to be presently fully pointed out. Pivotally connected to the upper end of the arm 69 is the upper end of a link 76 provided with spaced set screws 77 which are threaded therein and through a slot 78 formed in another link 79, the two links being in this manner adjustably connected so as to form a rigid connection depending from the arm 69 and adjustable as to length. The numeral 80 indicates the lever for opening and closing the diaphragm 5 and a screw 81 serves to pivotally connect the lower end of the link 79 and the end of the said lever 80. It will now be apparent and particularly by reference to Fig. 2, that when the arm 69 is swung downwardly, the lever 80 will be correspondingly swung and the diaphragm 5 will be opened. On the other hand it will be understood that after the arm 69 has been swung downwardly and movement in a reverse direction is imparted to it, the lever 80 will be swung upwardly thereby closing the said diaphragm 5. As the ordinary diaphragm is not constructed to completely close and as it is necessary that there be a total occultation of the light between periods of projection, there is provided a shutter arrangement which operates in conjunction with the diaphragm and which comprises an arm of relatively thin material, indicated at 82, and pivoted at 83 to the mounting for the diaphragm 5. This arm is curved adjacent its pivot, as at 84, and is provided at its free end with a slot 85 which slidably receives the shank of the screw 81. The concave edge of the curved portion 84 of the shutter arm 82 is provided with a projecting leaf portion 86 and it will be observed by reference to Fig. 2, that when the diaphragm 5 is closed, the shutter arm 82 will be in such position that its lever portion 86 will cover the opening left between the inner ends of the leaves of the diaphragm. However, as the arm 69 is swung downwardly and the diaphragm is gradually opened, the shutter arm 82 will also be swung downwardly and its curved portion 84 will clear the gradually increasing opening resulting from the relative movement of the diaphragm leaves 5.

Fig. 5 comprises a series of diagrammatic views illustrating the relative movements of the gears 39 and 41 and the pinions 28 and 58, and in each of these views the several gear portions and pinions are indicated by their associated reference numerals and each view is designated by legends indicating the distances and the direction in which the crank handle 52 has been turned immediately prior to the gear portions and pinions assuming the relative positions shown in said view.

In the operation of the apparatus, assuming the slide carrier to be at the right hand limit of its shifting movement and the gear portions 44, 45 and 46 to be in the relative positions shown in that one of the diagrammatic views indicated at A, as also the pinions 28 and 58, the left hand one of the lantern slides will be in position for projection and the diaphragm will be open. The crank 52 is now given a half turn forwardly and as it is so moved the gear portion 44 will coöperate with the pinion 58 to rotate the shaft 57 and gradually close the diaphragm through the medium of the arm 69 and the elements associated therewith. At the end of this movement of the crank 52 the gear portions will be in the relative positions shown in that one of the diagrammatic views indicated at B. The rotation of the crank handle 52 in the direction stated is then continued for another half turn and during this movement of the crank the gear portion 45 will pass the pinion 28, rotating the same and imparting movement to the rack 21 through the medium of the segmental gear 29 to shift the slide carrier to the left, the diaphragm in the meantime remaining closed. The gear portions will at this time occupy the relative positions shown in view C in Fig. 5. Upon further rotation of the crank handle in the direction stated through one-half turn, the gear portion 46 will pass the pinion 58 and this pinion will be rotated in a direction the reverse of that in which it was rotated by the gear portion 44 and the diaphragm will be gradually turned to permit of projection of the right handle lantern slide in the slide carrier. The left hand lantern slide is then removed and a new one substituted therefor. After the right hand slide has been projected the desired length of time the crank handle 52 is turned in a reverse direction through one-half turn and this will result in the gear portion 46 again passing the pinion 58, but in a reverse direction, so as to again gradually close the diaphragm. The movement of the crank handle in the direction stated is continued for another half turn, which will result in the gear portion changing from the positions shown in view E to that shown in view F of Fig. 5, and in such movement of the gears, the gear portion 45 will pass the pinion 28 and the slide carrier will again be shifted toward the right so as to bring the new slide into position for projection, the diaphragm in the meantime remaining closed. A continued movement of the crank handle in the direction stated for another half turn will cause the gear portion 44 to pass the pinion 58 and the diaphragm will be gradually opened so as to permit of projection of the new slide.

From the foregoing description of the invention it will be seen that it is necessary to employ but a single source of illumination and but a single set of condensing and projecting lenses and that the slide carrier and diaphragm are moved at proper intervals and automatically merely upon rotating the crank 52. As a consequence it is only necessary for the operator of the machine to turn the crank at the desired rate of speed and to remove and replace the slides at the occurrence of each period of total occultation.

In the claims reference is made to view dissolving means. This expression is intended to define any means whatsoever operable to dissolve or fade a view and then illuminate the same. In the claims I have also referred to a lens set and by this is meant any well known or preferred arrangement of condensing and projecting lenses or any arrangement of lenses whatsoever suitable for use in stereopticon projection. The claims also refer to a projection apparatus including a single source of illumination and in this respect they are intended to distinguish from an apparatus including two lamp houses or two sources of illumination, or, in other words, a double projection apparatus.

Having thus described the invention, what is claimed as new is:

1. In projection apparatus of the class described, which apparatus embodies a single source of illumination and a single lens set and a lens shutter, a reciprocatory slide carrier actuating member, an actuating member for the shutter, a shaft having operative connection with the slide carrier shifting member, a shaft having operative connection with the actuating member for the shutter, and gear means operable to actuate the said shafts in predetermined sequence.

2. In projection apparatus of the class described including a slide carrier and an occulting shutter, a shiftable member for actuating the slide carrier, means for shifting the member to successively present the slides carried thereby for projection, means for actuating the shutter to alternately secure illumination and occultation, and means common to the two last mentioned means operable to actuate the same in predetermined sequence.

3. In projection apparatus of the class described including a slide carrier and an occulting shutter, spaced gears having gear portions relatively angularly spaced, each of said operating means including a shaft, gears carried by the shafts and operating between the first mentioned gears, and means for imparting rotary motion to the first mentioned gears whereby to cause their gear portions to coöperate with the gears upon the shafts in predetermined sequence.

4. In projection apparatus of the class described, which apparatus embodies a single source of illumination and a single lens set and a lens shutter, a reciprocatory slide carrier actuating member including a rack bar, a gear element for coöperation with the rack bar, spaced gears rotatable in unison and having relatively angularly positioned gear segments, a gear operatively connected with the first-mentioned gear element and working between the last-mentioned gears, means for rotating the last-mentioned gears, a shaft mounted for rotation, a gear element carried thereby and also working between the last-mentioned gears, and operative connection between the last-mentioned shaft and the said shutter.

5. In projection apparatus of the class described, which apparatus embodies a single source of illumination and a single lens set and a lens shutter, a rotatable shaft, gears carried by the shaft and having their toothed faces presented toward each other in spaced relation, the said gears having gear segments relatively angularly disposed, a gear working between the first-mentioned gears, a slide carrier actuating member operated through the rotation of the last-mentioned gear, means for rotating the first-mentioned gears in unison, a shaft, a gear carried thereby and working between the first-mentioned gears, and operative connection between the said shaft and the lens shutter.

In testimony whereof I affix my signature in presence of two witnesses.

CHARLES H. PARTINGTON. [L. S.]

Witnesses:
G. A. GINTER,
GEO. ASHTON.

Copies of this patent may be obtained for five cents each, by addressing the "Commissioner of Patents, Washington, D. C."